(12) United States Patent
Chapman

(10) Patent No.: US 12,198,090 B2
(45) Date of Patent: Jan. 14, 2025

(54) APPARATUS AND METHOD FOR GENERATING SYSTEM IMPROVEMENT DATA

(71) Applicant: The Blue Collar Success Group, LLC, Scottsdale, AZ (US)

(72) Inventor: Kenny Chapman, Scottsdale, AZ (US)

(73) Assignee: The Blue Collar Success Group, LLC, Scottsdale, AZ (US)

( * ) Notice: Subject to any disclaimer, the term of this patent is extended or adjusted under 35 U.S.C. 154(b) by 0 days.

(21) Appl. No.: 18/111,924

(22) Filed: Feb. 21, 2023

(65) Prior Publication Data

US 2024/0281747 A1   Aug. 22, 2024

(51) Int. Cl.
| | |
|---|---|
| G06Q 10/0639 | (2023.01) |
| G06F 16/2458 | (2019.01) |
| G06F 16/906 | (2019.01) |
| G06F 16/951 | (2019.01) |
| G06N 3/08 | (2023.01) |

(52) U.S. Cl.
CPC ... *G06Q 10/06393* (2013.01); *G06F 16/2468* (2019.01); *G06F 16/906* (2019.01); *G06F 16/951* (2019.01); *G06N 3/08* (2013.01)

(58) Field of Classification Search
CPC .......... G06Q 10/06393; G06F 16/2468; G06F 16/906; G06F 16/951; G06N 3/08
See application file for complete search history.

(56) References Cited

U.S. PATENT DOCUMENTS

| | | | |
|---|---|---|---|
| 6,411,952 B1* | 6/2002 | Bharat ................. | G06F 16/951 707/999.005 |
| 7,483,842 B1* | 1/2009 | Fung ..................... | G06Q 30/02 705/7.14 |
| 11,507,908 B2 | 11/2022 | Singh | |
| 2015/0294255 A1* | 10/2015 | Hussaini .......... | G06Q 10/06393 705/7.39 |
| 2015/0309506 A1* | 10/2015 | Naduthota ............ | G06N 5/048 700/44 |
| 2018/0114128 A1* | 4/2018 | Libert ................... | G06Q 10/00 |

(Continued)

OTHER PUBLICATIONS

Sotiris Batsakis, Euripides G.M. Petrakis, Evangelos Milios, "Improving the performance of focused web crawlers" Data & Knowledge Engineering, vol. 68, Issue 10, 2009, pp. 1001-1013. https://www.sciencedirect.com/science/article/pii/S0169023X0900055X (Year: 2009).*

(Continued)

*Primary Examiner* — Eric W Stamber
*Assistant Examiner* — Alissa D Karmis
(74) *Attorney, Agent, or Firm* — Caldwell Intellectual Property Law

(57) ABSTRACT

An apparatus and method for generating improvement data, wherein the apparatus includes at least a processor, a memory communicatively connected to the at least a processor, wherein the memory containing instructions configuring the at least a processor to receive system data, wherein receiving the system data includes training and utilizing a web crawler to generate a web index of the system data, receive user data related to a plurality of users classify the system data and user data to a performance range category, and generate, as a function of the performance range category, improvement data.

14 Claims, 7 Drawing Sheets

(56) References Cited

U.S. PATENT DOCUMENTS

| | | | |
|---|---|---|---|
| 2018/0150562 A1* | 5/2018 | Gundimeda | G06F 40/205 |
| 2020/0210647 A1* | 7/2020 | Panuganty | G06N 20/10 |
| 2020/0234217 A1* | 7/2020 | Arora | G06Q 10/06393 |
| 2020/0394534 A1* | 12/2020 | Krishnan | G06F 17/15 |
| 2021/0065091 A1 | 3/2021 | Bhattacharyya | |
| 2022/0156667 A1 | 5/2022 | Bellenguez | |
| 2022/0245557 A1 | 8/2022 | Minter | |
| 2022/0253784 A1* | 8/2022 | Mullinjer | G06Q 10/04 |
| 2022/0300881 A1* | 9/2022 | Singh | G06N 20/10 |
| 2022/0391815 A1* | 12/2022 | Hampapur | G06Q 10/067 |

OTHER PUBLICATIONS

Gautam Pant and Padmini Srinivasan, "Link contexts in classifier-guided topical crawlers," in IEEE Transactions on Knowledge and Data Engineering, vol. 18, No. 1, pp. 107-122, Jan. 2006 https://ieeexplore.ieee.org/stamp/stamp.jsp?tp=&arnumber=1549831 (Year: 2006).*

Johny Ghattas, Pnina Soffer, Mor Peleg, Improving business process decision making based on past experience, Decision Support Systems, vol. 59, 2014, pp. 93-107, (https://www.sciencedirect.com/science/article/pii/S016792361300256X). (Year: 2014).*

* cited by examiner

APPARATUS AND METHOD FOR GENERATING SYSTEM IMPROVEMENT DATA

FIELD OF THE INVENTION

The present invention generally relates to the field of evaluating performance metrics. In particular, the present invention is directed to an apparatus and method for generating system improvement data.

BACKGROUND

Current methods of system performance evaluation are insufficient for developing plans for performance improvement. There is a need for generating customized plans of action for improving system performance metrics.

SUMMARY OF THE DISCLOSURE

In an aspect, an apparatus for generating system improvement data, wherein the apparatus includes at least a processor, a memory communicatively connected to the at least a processor, wherein the memory containing instructions configuring the at least a processor to receive system data, wherein receiving the system data includes training and utilizing a web crawler to generate a web index of the system data, receive user data related to a plurality of users classify the system data and user data to a performance range category, and generate, as a function of the performance range category, system improvement data In another aspect, a method for generating system improvement data, wherein the method includes utilizing a computing device to receive system data, wherein receiving the system data includes training and utilizing a web crawler to generate a web index of the system data, receive user data related to a plurality of users classify the system data and user data to a performance range category, and generate, as a function of the performance range category, system improvement data These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating system improvement data. In an embodiment, improvement data may be contained in an improvement plan outlining a plurality of steps geared towards improving system performance. Methods described herein may be used to identify specific areas of low performance in a system and calibrate steps in a plan tailored to improve performance in those areas. Methods described herein may be used to improve classification and evaluation methods of a system based on overall or specific standard of metrics.

Exemplary embodiments illustrating aspects of the present disclosure are described below in the context of several specific examples.

Figure 1:
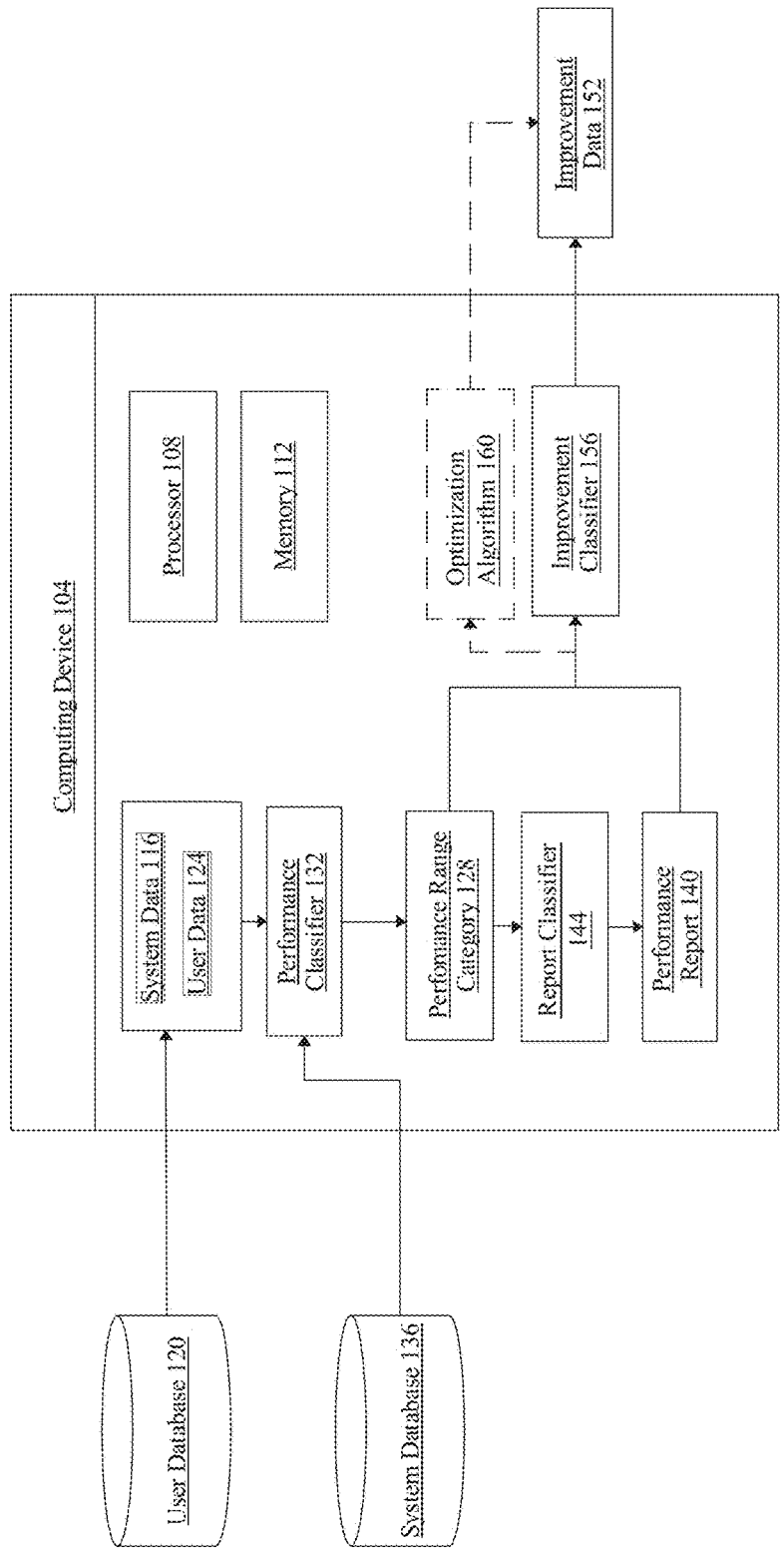
FIG. 1 is a block diagram of an exemplary embodiment of an apparatus for generating system improvement data.

Referring now to FIG. 1, an exemplary embodiment of apparatus 100 for system improvement data is illustrated. Apparatus 100 includes a computing device 104. Computing device 104 includes a processor 108 and a memory 112 communicatively connected to the processor 108, wherein memory 112 contains instructions configuring processor 108 to conduct the process. Processor 108 and memory 112 is contained in computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive system data 116, wherein receiving the system data 116 may include training a web crawler to generate a web index of the system data 116. "System data," as used herein, is information related to a system. A "system," as used herein is an organization. A system may relate to a business focused organization or a non-business focused organization. A business focused organization may include an organization producing, buying, or selling a good or service in exchange for pecuniary gain. A non-business focused organization may include an organization not focused on a business practice but reaching a certain goal, such as, a charity organization focused on raising awareness. System data 116 may be received in the form of printed or handwritten text, documents, scanned documents, photos of a document, a scene-photo (for example the text on signs and billboards in a landscape photo), and the like. For example, system data 116 may include bank statements, invoices, business cards, and the like. System data 116 may include financial information, identification data, employee/member metrics, performance metrics, and the like. Financial information may include a history and/or timeline of financial gain, loss, debts, credit, and the like. For example, financial information may include a type and total amount of debt an organization has. Financial information may include a timeline incorporating trends in financial gain or loss of the organization. Financial information may include a credit report history of the organization. Identification data may include the name of the organization, formation history, field of expertise, geographic location, number of organization branches and the location of each, markets/fields the organization is involved in and the like. Employee/member metrics may include a history and/or timeline of employment or membership. For example, a history may include the current total number of employees, the number of employees or members lost at a particular time frame and the like. An employment timeline may include trends in the employment history. For example, the times of the year most employees join, leave or are fired from the organization. Performance metrics may include a history or timeline of goals or performance standards set by the organization that are met or not met. For example, a performance metric may be based on pecuniary growth of the organization in a year. A performance metric timeline may include trends in performance goals being met or not being met. For example, time periods the organization tends to see significant pecuniary loss.

Still referring to FIG. 1, system data 116 may be received from a user. A "user," as used herein is a person involved in the system. For example, an employee or member of an organization. System data 116 may be received from a user database 120. A "user database," as used herein, is a data structure populated with data related to a system. Databases, as used throughout this disclosure, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some embodiments, system data 116 may be received by a user through a graphical user interface communicatively connected to computing device 104. In some embodiments, computing device 104 may generate and transmit surveys or questionnaire for a user to fill. For example, computing device 104 may send a smart assessment to a user by a graphical user interface or remote computing device 104 operated by the user. A "smart assessment," as used herein is a set of questions that ask for information. Each question may contain answers that influences any processing or classification step performed by the computing device 104 as described further below. For example, a smart assessment may contain curated questions to gather financial information, identification data, employee/member metrics, performance metrics, and the like.

Still referring to FIG. 1, computing device 104 may train and utilize a web crawler to receive system data 116 and generate a web index of the system data 116. A "web crawler," as used herein, is a program that systematically browses the internet for the purpose of web indexing. A "web index," as used herein is information gathered by a web crawler indexed into a data structure. Computing device 104 may generate a query to retrieve data indexed in a data structure as a function of the web crawler as described further below. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape system data 116 from a plurality organization related websites. For example, homepages, business review websites, customer review websites, social media platforms, business forums, and the like. The web crawler may be seeded and/or trained with a reputable website, such as the Better Business Bureau, to begin the search. A web crawler may be generated by computing device 104. In some embodiments, the web crawler may be trained with information received from a user through a graphical user interface. In some embodiments, the web crawler may be configured to generate a web query. A web query may include a search criterion received from a user or generated by computing device 104. For example, a search criterion may be focused on finding customer reviews of an organization or notable accolades. Additionally, the web crawler function may be configured to search for and/or detect one or more data patterns. A "data pattern" as used in this disclosure is any repeating forms of information. A data pattern may include repeating negative or positive reviews by people and the like. In some embodiments, the web crawler may be configured to determine the relevancy of a data pattern. Relevancy may be determined by a relevancy score. A relevancy score may be automatically generated by computing, received from a machine learning model, and/or received from the user. In some embodiments, a relevancy score may include a range of numerical values that may correspond to a relevancy strength of data received from a web crawler function. As a non-limiting example, a web crawler function may search the Internet for system data 116 related to organization pecuniary information. The web crawler may return system data 116, such as, as non-limiting examples, investment data, articles covering the financial loss of the organization, and the like.

Still referring to FIG. 1, computing device 104 may receive system data 116 relating to an organizational identifier. An "organizational identifier" as used herein is a category of system data. For example, an organizational identifier may be financial information, identification data, employee/member metrics, performance metrics, and the like. In some embodiments, a web crawler may index system data 116 in a web index according to a plurality of organizational identifiers. Computing device 104 may generate a query related to an organizational identifier to retrieve relevant system data 116 from the web index. A "query," as used herein, is datum used to retrieve correlated data from a data structure. Computing device 104 may utilize a plurality of keywords, phrases and the like to retrieve system data 116 related to an organization identifier. For example, a phrase "2018 profit margins" may be utilized to retrieve system data 116, such as sales history, investments, and the like relevant to the query.

Still referring to FIG. 1, computing device 104 is configured to receive user data 124 related to a plurality of users. "User data," as used herein is information about a user in correlation to a system. User data 124 may include testimonies or feedback from users related to the functioning of the organization, such as employee relations, employee satisfaction, employee productivity, and the like. For example, user data 124 may relate to a dissatisfaction in pay or workload received from the plurality of users. In some embodiments, user data 124 may include areas of improvements requested by employees, such as pay, or suggestions to improve the function of the organization, such as ideas for improving productivity. User data 124 may include identification data of the users, for example, job title, years of employments, contribution to the organization, and the like. User data 124 may be received from the user database 120 or using methods as described above. Computing device 104 may weigh user data 124 from senior employees more heavily than that of an entry level member when generating improvements plans/data as described further below. In some embodiments, computing device 104 may use a language processing model trained to identify keywords or key symbols to analyze and sort user data 124 based on areas of concern or identification of the user. Computing device 104 may aggregate the language processing model output to determine an average area of interest or concern of users. For example, most users may be more interested in improving productivity than relationships.

Still referring to FIG. 1, computing device 104 perform optical character recognition to extract system data 116 or user data 124 from documents, photos of documents, receipts, business cards, and the like. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, computing device 104 may utilize a language processing model or a machine-learning process, as described further below, to determine trends in system data 116 as described above. For example, a language processing model may be trained with keywords or key symbols such as "loss", "debt", "-", "negative balance," to identify trends of pecuniary loss in system data 116. Computing device 104 may identify inconsistencies contained in system data 116 utilizing a language processing model. An "inconsistency," as used herein, inaccurate information. Inconstancies may include conflicting profit margins, investment records, employee count and the like. In some embodiments, inconsistencies may include missing elements of system data 116 requested by the computing device 104 (i.e., smart assessment). For example, missing credit reports, employee headcount, identification data, and the like. A language processing model may be used to parse and categorize information contained in system data 116. Any conflicting elements of system data 116 may be flagged by computing device 104 and a notification may be sent to the user for correction by a graphical user interface or remote user device. A "user device," also referred to as a remote device, is computing device operated by a user. Computing device 104 may automatedly correct the identified inconsistencies in system data 116. Corrections may include implementing data retrieved by a web crawler as described above. For example, if the geographic location of an organization is missing, computing device 104 may train a web crawler to retrieve the missing information from the web index. In some embodiments, computing device 104 may use a language processing model in tandem with the web index generated by a web crawler to spot and/or correct inconsistencies. For example, computing device 104 may identify inconsistencies found in pecuniary information, generate a query to find relevant pecuniary information stored in web index, and apply the correct information to any processing and classifications steps performed by the computing device 104 as described further below. In some embodiments, computing device 104 may send a notification to a user containing the inconsistency and the corrected information. In some embodiments a user may approve or disapprove of the correction before implantation of the information in processing.

Still referring to FIG. 1, in some embodiments, identifying inconsistencies in system data 116 may include utilizing a voting algorithm. A voting algorithm may refer to the identification of redundant elements of system data 116 related to an organizational identifier compared to variant elements of system data 116. Computing device 104 may use a voting algorithm to flag variant elements of system data 116 as function of a query, verification of a smart assessment, and the like. A voting algorithm may include algorithms such as the Boyer-Moore majority vote algorithm. In its simplest form, the voting algorithm may find a majority element of system data 116, if there is one: that is, an element that occurs repeatedly for more than half of the elements of system 116. A version of the voting algorithm may make a second pass through system data 116 in order to verify that the elements of system data 116 found in the first pass really is a majority. As an example, regarding financial information, an element of system data 116 may be received by a user stating the organization has a 3 million dollar debt, computing device 104 may verify this by performing a query in a web index to retrieve elements of system data 116 relevant to debts, computing device 104 may then use a voting algorithm wherein the user statement of the organization debt and the data elements related to debts retrieved from the web index is inputted in the voting algorithm. Continuing the example, if a majority of the data entries/inputs support the 3 million dollar debt then the element of system data 116 stating a 3 million dollar debt "wins," in contrast, if variant elements of system data 116 are identified then the 3 million debt may be flagged as inconsistent.

Still referring to FIG. 1, in some embodiments, identifying inconsistencies in system data 116 may include utilizing a machine-learning model or a neural network configured to identify inconsistent system data 116. The machine-learning model may receive inputs as described above, such as data received from a user and data received from a web index and output an identification of inconsistent system data 116. The machine-learning model may be trained by training data comprising inconsistent system data correlated to organizational identifiers. Training data may also include examples of insufficient smart assessments, insufficient input values (e.g. incorrect usage of numerical symbols), and the like.

Still referring to FIG. 1, computing device 104 may utilize a language module to generate a language processing model. Language processing module may include any hardware and/or software module. Language processing module may be configured to extract, from one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model. language processing module may operate to produce a language processing model. Language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between extracted words, phrases, and/or other semantic units. There may be a finite number of categories to which an extracted word may pertain, an HMM inference algorithm, such as the forward-backward algorithm or the Viterbi algorithm, may be used to estimate the most likely discrete state given a word or sequence of words Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, computing device 104 is configured to classify system data 116 and user data 124 to a performance range category 128. A "performance range category," as used herein, is a classification of a system based on plurality of metrics. A "metric," as used herein, is a value related to an evaluation of one or more parameters. For example, a metric may be the gross percentage profits of an organization over certain period of time. Performance range category 128 classes may include categories that overall label an organization into a performance range based on a standardized set of metrics. Performance range categories may include linguistic labels such as "good," high," "low," "poor," "deteriorating," and the like. A performance range category 128 may be a ranking or percentage. For example, an organization may rank in the top 10% in overall performance. A standardized set of metrics may include key performance metric indicators (KPI) such as strategic KPIs, Operational KPIs, Leading/lagging KPIs, or Functional KPIs. Strategic KPIs may include big-picture key performance indicators monitoring organizational goals. Examples include return on investment, revenue, and market share. Operational KPIs may measure performance in a shorter time frame, and may be focused on organizational processes and efficiencies. Some examples include sales by region, average monthly transportation costs and cost per acquisition (CPA). Leading/lagging KPIs may track what has already happened. Functional KPIs may be key performance indicators tied to specific functions, such finance or IT. Computing may use plurality of standardized metrics to base the performance category on. In some embodiments, computing device 104 may receive a KPI, standard metric, or performance category to classify data from a user. For example, computing device 104 may classify data based on finance KPIS. In some embodiments, standard metrics may be generated by computing device 104 based on historical data received. "Historical data," as used herein is feedback related to performance range classification. For example, historical data may include user feedback related to standardized metrics used, previous metrics fed into computing device 104 or derived by computing device 104, and the like. Performance range category 128 may derive from a performance class bank stored in system database 136. A "performance class bank," as used herein is a data structure populated with data related to performance range classification, such as standardized metrics as described above. A performance class bank may be stored and received from a system database 136 communicatively connected to computing device 104. A "system database," as used herein, is a data structure containing data used to classify a system. System database 136 may be implemented as described above. In some embodiments, system database 136 may be contentiously populated by a web crawler trained to retrieve and index standard metrics that may be used to classify an organization.

Still referring to FIG. 1, computing device 104 may train and use a machine-learning model, such as a classifier, to classify system data 116 and user data 124 to a performance range category 128. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Computing device 104 may use a performance range classifier. A performance classifier 132 may include a classifier configured to receive system data 116 and user data 124 as an input and output the performance range category 128. Performance category training data may include data correlating system data 116 and user data 124 to a plurality of ideal performance metrics. An "ideal performance metric," as used herein, is a metric related to an idyllic and/or optimal function of a system. For example, an ideal metric for employment retainment in in year may be 70%. Ideal performance metrics may be derived from standardized metrics as described above. In some embodiments, ideal performance metrics may be derived by computing device 104 using a web crawler. For example, a web-crawler may be seeded/trained to index the performance metrics of top ranked organizations most related to system data 116. In some embodiments, ideal performance metrics may be received from a user through methods as described above. For example, a user may transmit ideal metrics they would like to see for the organization, such as a certain productivity score, employee satisfaction rating, and the like.

Still referring to FIG. 1, computing device 104 may generate performance metrics for a system based on system data 116 and user data 124 utilizing a machine-learning process. A machine-learning model may be used to classify elements of system data 116 to standardized metrics as described above. For example financial information of a system may be classified to a finance rubric (i.e., standardized metric). A finance rubric may contain a plurality of goals for an organization to meet. Each goal may be assigned a weighted value. The machine-learning model, trained by training data as described above, may classify relevant elements of financial information to each goal in the finance rubric and output the goals met. Computing device 104 may then perform mathematical operations/functions, such as addition, subtraction, division, and the like to aggregate the total number of goals met to generate a score as the performance metric.

Still referring to FIG. 1, in some embodiments, computing device may utilize fuzzy set comparison techniques, as described further below, to compare the performance metrics of a system to ideal performance metrics. For example, a first fuzzy set may represent a performance metric or a combination of performance metrics of a system. A second fuzzy set fuzzy set may represent an ideal performance metric or a combination of ideal performance metrics. A degree of match between fuzzy sets may be used to classify a performance metric with an ideal performance metric. For instance, if an ideal performance metric has a fuzzy set matching a performance metric fuzzy set by having a degree of overlap exceeding a threshold, computing device 104 may classify the performance metric as belonging to the ideal performance metric categorization. Where multiple fuzzy matches are performed, degrees of match for each respective fuzzy set may be computed and aggregated through, for instance, addition, averaging, or the like, to determine an overall degree of match.

Still referring to FIG. 1, computing device 104 may be configured to generate any classifier described in this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate any classifier described in this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 104 may be configured to generate a performance report 140 comprising a plurality of inadequate performance metrics. A "performance report," as used herein, is an outline of evaluated metrics. Performance metrics are metrics as described above, used in the classification of system data 116 and user data 124 by the performance classifier 132. Computing device 104 may receive performance range category 128 output from performance classifier 132 and input the data in a report classifier 144. A "report classifier," is a classifier configured to output the performance report. Report classifier 144 training data may include system data 116 and user data 124 correlated to inadequate performance metrics. Inadequate performance metrics may be based on a level of underperformance in one or functions of an organization. For example, a function may relate to sales, marketing, customer service, recruitment, fundraising, and the like. Report classifier 144 training data may further include, ideal performance metrics, historical data, and any other data described throughout this disclosure.

Still referring to FIG. 1, in some embodiments, generating performance report 140 and/or comparison of performance metrics to ideal performance metrics, may include ranking or scoring the plurality of inadequate performance metrics based on a level of underperformance. Ranking the plurality of inadequate performance metrics may include utilizing a fuzzy set inference system as described further below, or any scoring methods as described throughout this disclosure. For example, and without limitation computing device 104 may use a fuzzy logic model to determine an ideal performance metric response as a function of fuzzy set comparison techniques as described in this disclosure. In some embodiments, each performance metric to be compared to ideal performance metrics may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may in turn be "defuzzified" as described in further detail below to provide an overall output and/or assessment. For instance, regarding a finance performance metric, a first linguistic variable representing a profit metric may take as potential values in a collection of fuzzy sets covering the range of potential values from "poor" (representing a fuzzy set ranging from 0 to 100,000 dollars), "okay" representing a fuzzy set ranging from 50,000 to 500,000 dollars, and "good" representing a fuzzy set from 100,000 and up. A second linguistic variable representing an investment metric may take as potential values in a collection of fuzzy sets covering the range of potential values from "poor" (representing a fuzzy set ranging from 0 to 100,000 dollars), "okay" representing a fuzzy set ranging from 50,000 to 500,000 dollars, and "good" representing a fuzzy set from 100,000 and up. An inference engine may be implemented to output a third linguistic variable, an ideal performance metric response, that may represent, without limitation, a score value based on the comparison of the first and second linguistic variable. The inference engine may combine rules, such as: "if the investment value is 'poor' and the profit value is 'good', the finance performance metric is 'inadequate'; "if the investment value is 'high' and the profit value is 'high,' the finance performance metric is 'exceptional'; "if the investment value is 'oaky' and the profit value is 'oaky,' the performance metric is 'adequate'"—the degree to which a given input function membership matches a given rule may be determined by a triangular norm or "T-norm" of the rule or output membership function with the input membership function. Computing device 104 may use the fuzzy set inference system to score a plurality of performance metrics using linguistic variables as described above. As a function of the fuzzy system, computing device 104 may evaluate and rank a plurality of output linguistic variables to be implemented in performance report 140. Computing device 104 may transmit the performance report 140 to a remote device or graphical user interface, for example, as a document, text email, and the like.

Still referring to FIG. 1 computing device 104 is configured to generate, as a function of the performance range category 128, system improvement data. "Improvement data," as used herein, is data related to improving the performance range of a system. Improvement data 152 may be formatted into or contained in a improvement plan. An "improvement plan," as used herein, is a data structure outlining steps toward performance improvement in a system. For example, an improvement plan may include areas of inadequate performance with data outlining steps that may be taken to improve adequacy. Steps may refer to actions that may be taken, such as retainment of employees or increasing work productivity. Steps may refer to ideas that may be implemented, for example, ideas that improves the finances of an organization. Steps may include actions an organization should refrain from. In some embodiments, steps in the improvement plan may be ordered, ranked, or prioritized to improve a specific performance metric and/or function of an organization based on the ranked inadequacy metrics of the performance report 140. Generating the improvement data 152 may include using an improvement classifier 156. An improvement classifier 156 may be a classifier configured to receive the performance range category 128 as an input and output of the improvement data/improvement plan. Improvement classifier 156 may receive training data correlating a plurality of elements of a performance report 140 to a plurality of improvement features. An "improvement feature," as used herein, is data related to a practice of an organization related to a system. For example, an improvement feature may be a sufficient business practice, hiring practice, investment practice, practiced by an organization in the same line of business to a system of system data 116, that may be implemented by the system to improve a performance metric. Improvement features may be derived by computing device 104 using web crawler, querying and language processing methods as described above. For example, computing device 104 use a web crawler in index organizations similar to the organization identified in system data 116 that preform higher in a specific, and or plurality of functions. Computing device 104 may use a language processing model in tandem with the web crawler/web index to access trends in data correlated to the high performance. For example, computing device 104 may identify hiring practices and work environment of an organization correlated to high employment retainment rates. Computing device 104 may use a machine-learning process to tailor improvement features to improvement data 152 for an organization. For example, a practice performed by multi-million-dollar corporation may be downsized to accommodate a startup business. Computing device 104 may transmit improvement data 152 to a user similar to the performance report 140 as described above.

Still referring to FIG. 1, in some embodiments, generating improvement data 152 may include transmitting the performance report 140 to a user, receiving user feedback containing prioritization of improving an inadequate performance metric of the plurality of inadequate performance metrics, inputting the user feedback into the improvement classifier 156 as an additional input; and outputting the improvement data 152 incorporating the user feedback. "User feedback," as used herein, is data received from a user in relation to an output of a computing device. For example, user feedback may include a user prioritizing improvement of a specific function of the organization first based on performance report 140. In some embodiments, computing device 104 may be configured to perform an optimization algorithm 160 to output improvement data 152 as a function on the performance range category 128 and/or performance report 140. Computing device 104 may compute a score associated with each ranked or unranked inadequate performance metric and select inadequate performance metrics to minimize and/or maximize the score, depending on whether an optimal result is represented, respectively, by a minimal and/or maximal score; a mathematical function, described herein as an "objective function," may be used by computing device 104 to score each possible pairing. Objective function may be based on one or more objectives as described below. In various embodiments a score of a particular inadequate performance metric may be based on a combination of one or more factors, including the plurality of improvement features. Each factor may be assigned a score based on predetermined variables. In some embodiments, the assigned scores may be weighted or unweighted. Objective function may be formulated as a linear objective function, which computing device 104 may solve using a linear program such as without limitation a mixed-integer program. A "linear program," as used in this disclosure, is a program that optimizes a linear objective function, given at least a constraint. A constraint may be element of system data 116 or user data 124. In various embodiments, apparatus 100 may determine improvement data 152 that maximizes a total score subject to the constraints in system data 116. A mathematical solver may be implemented to solve for the set improvement features that maximizes scores; mathematical solver may be implemented on computing device 104 and/or another device in system 100, and/or may be implemented on third-party solver.

With continued reference to FIG. 1, optimizing objective function may include minimizing a loss function, where a "loss function" is an expression an output of which an optimization algorithm 160 minimizes to generate an optimal result. As a non-limiting example, computing device 104 may assign variables relating to a set of parameters, which may correspond to score components as described above, calculate an output of mathematical expression using the variables, and select an improvement feature that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 1, apparatus 100 may operate within or be communicatively connected to a metaverse to receive, transmit, and display data as described throughout this disclosure. As used in this disclosure, "metaverse" is a simulated digital environment which uses virtual reality, augmented reality and concepts from social media which creates a space for user interaction imitating the real world.

Figure 2:
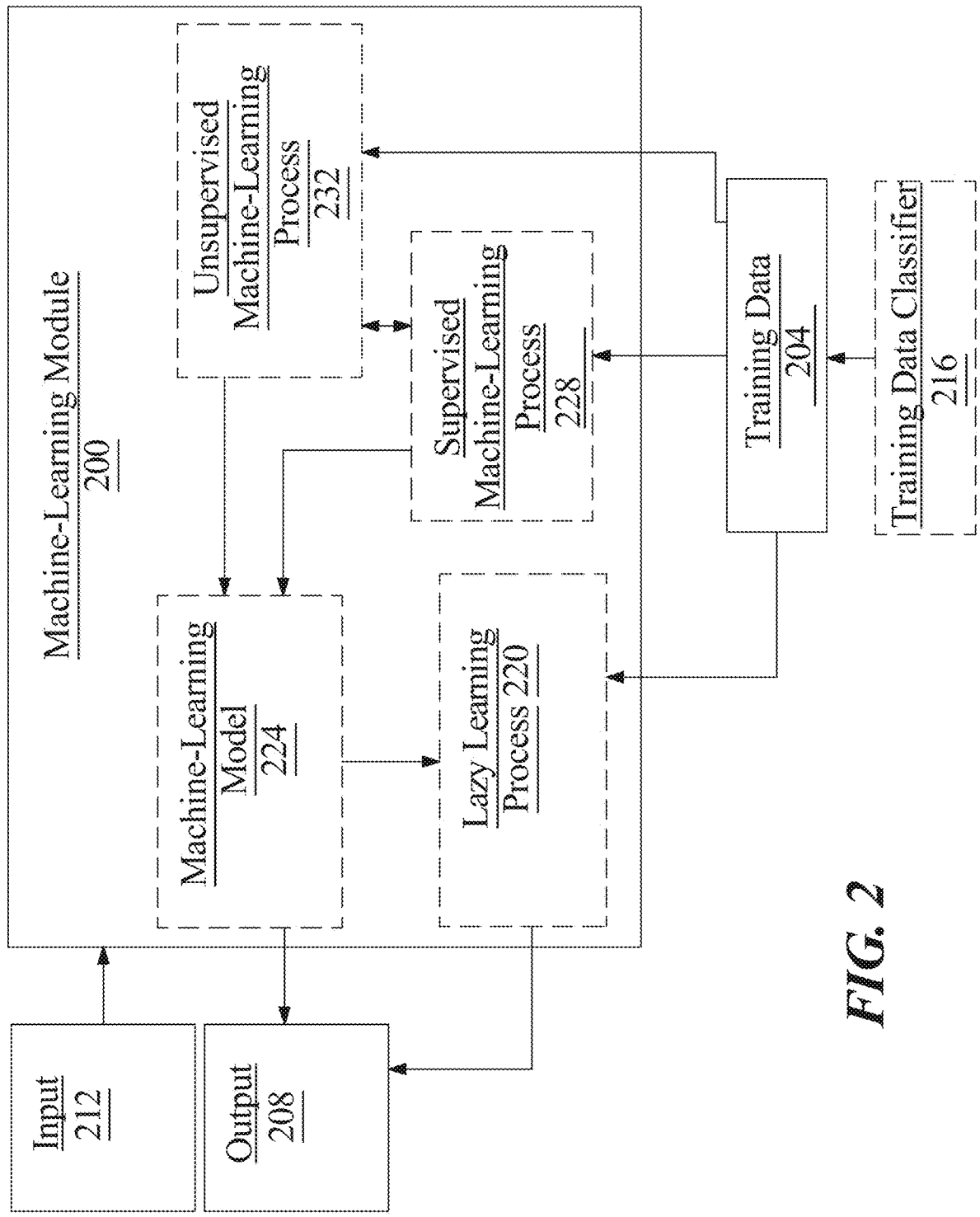
FIG. 2 is a block diagram of exemplary embodiment of a machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier generated by a machine learning algorithm known as a "classification algorithm". Machine-learning module 200 may generate a classifier using a classification algorithm, defined as a processes whereby a computing device and/or any module and/or component operating thereon derives a classifier from training data 204.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs and outputs described throughout this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
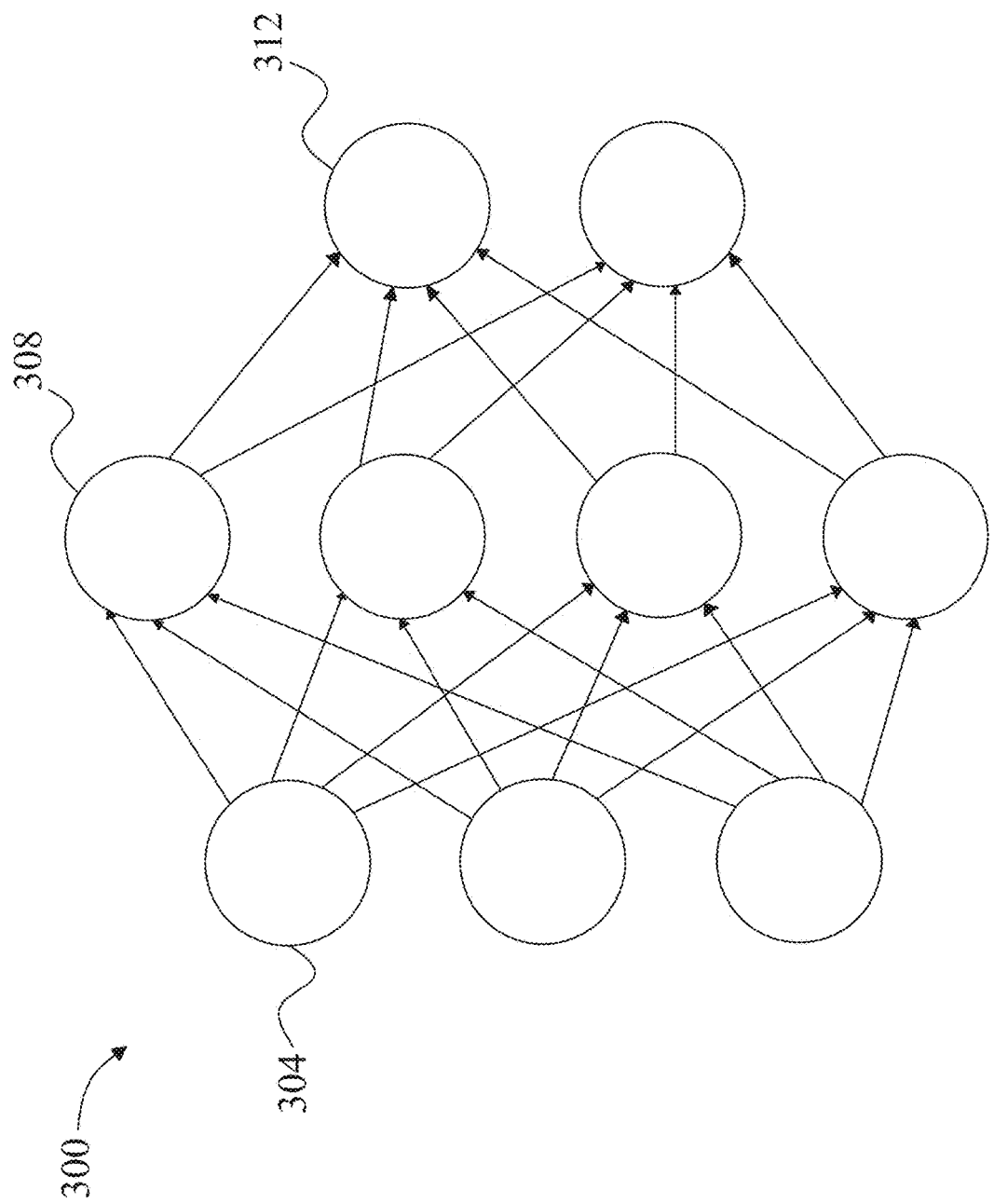
FIG. 3 illustrates an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
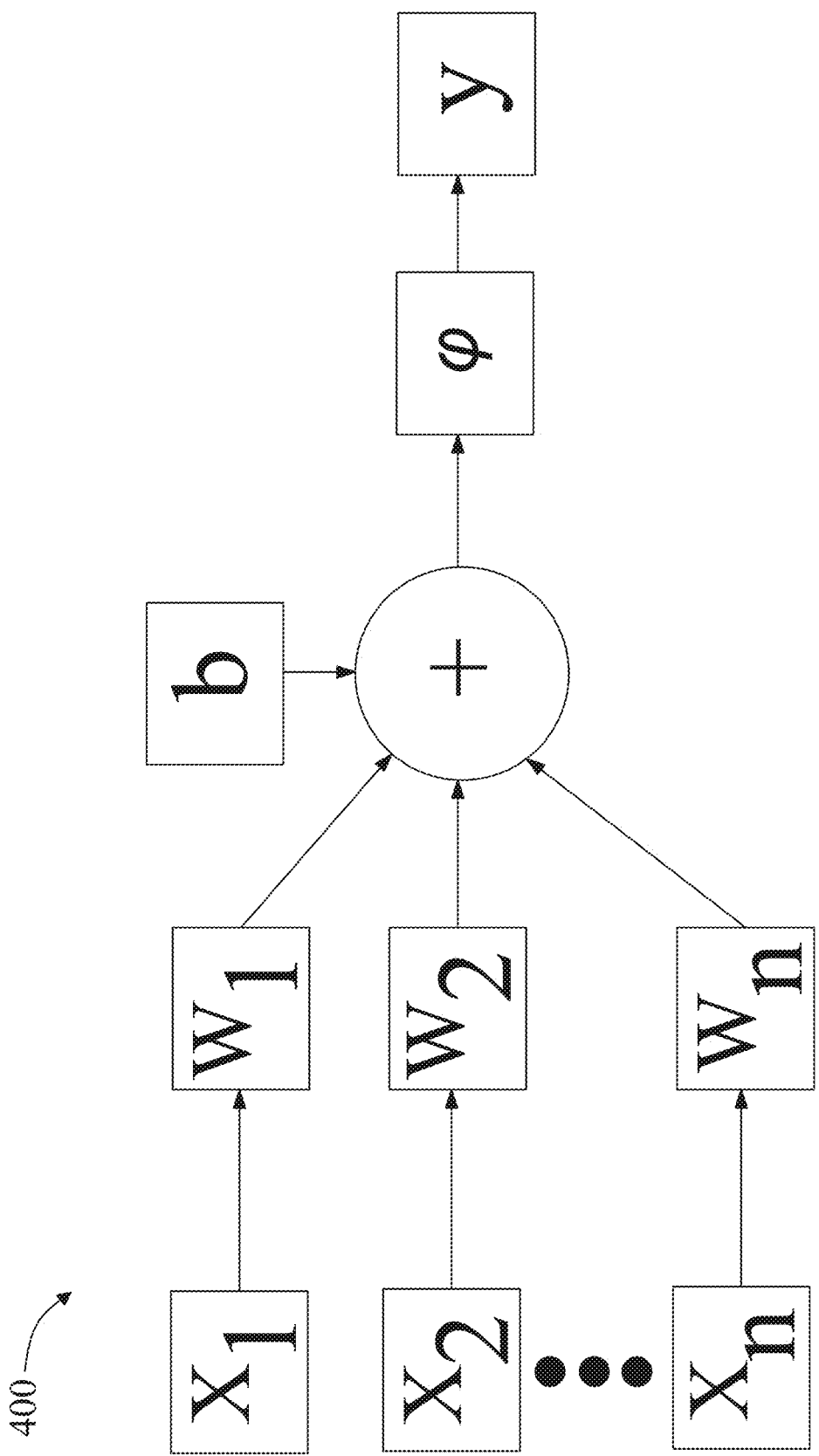
FIG. 4 is a block diagram of an exemplary node of a neural network.

Referring now to FIG. 4, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
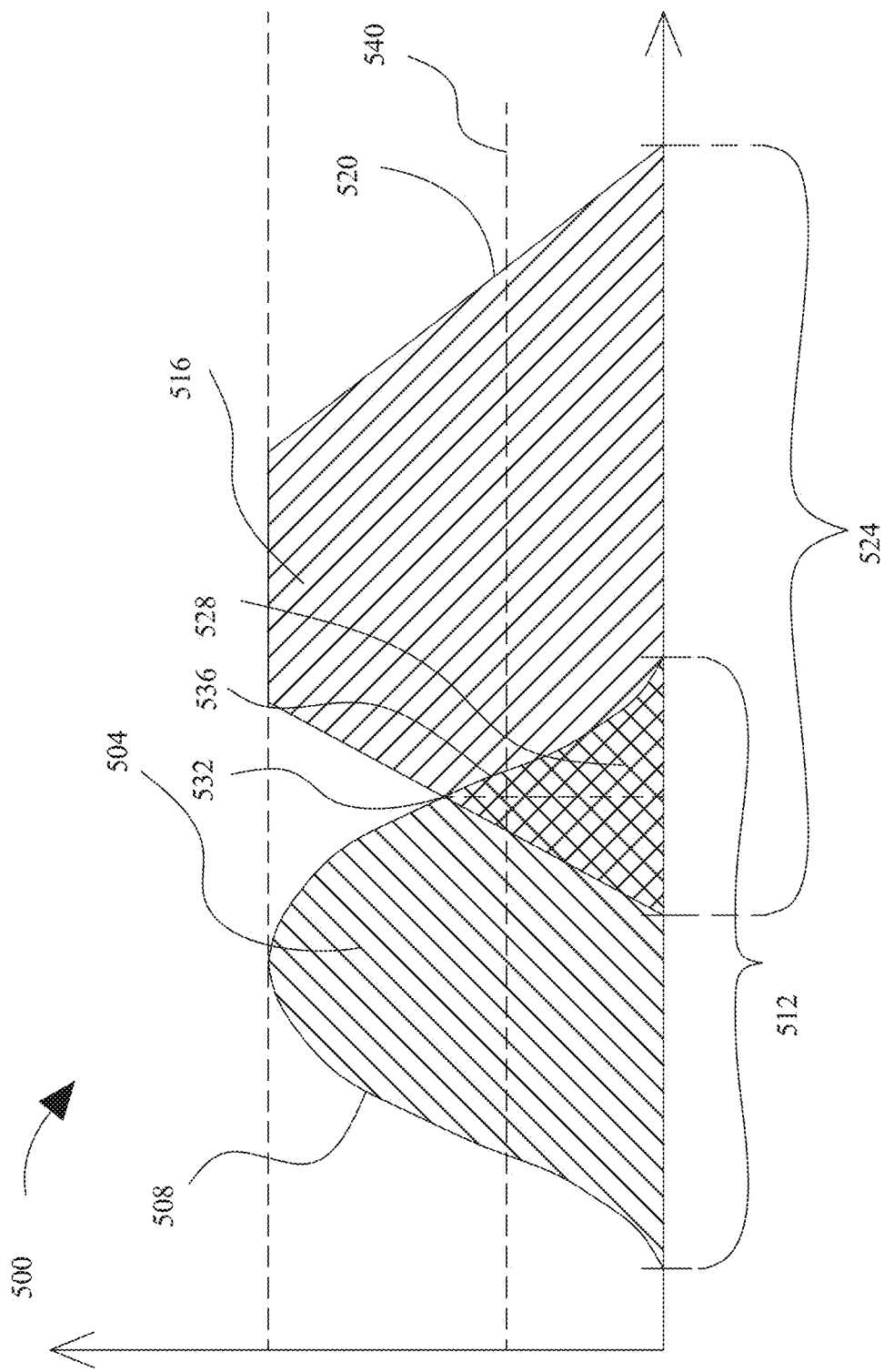
FIG. 5 is a graph illustrating an exemplary relationship between fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, performance metric, and a predetermined class, such as without limitation of ideal performance metric. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or performance metric and a predetermined class, such as without limitation ideal performance metric categorization, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify an performance metric with ideal performance metric. For instance, if an ideal performance metric has a fuzzy set matching performance metric fuzzy set by having a degree of overlap exceeding a threshold, computing device 104 may classify the performance metric as belonging to the ideal performance metric categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a performance metric may be compared to multiple ideal performance metric categorization fuzzy sets. For instance, performance metric may be represented by a fuzzy set that is compared to each of the multiple ideal performance metric categorization fuzzy sets; and a degree of overlap exceeding a threshold between the performance metric fuzzy set and any of the multiple ideal performance metric categorization fuzzy sets may cause computing device 104 to classify the performance metric as belonging to ideal performance metric categorization. For instance, in one embodiment there may be two ideal performance metric categorization fuzzy sets, representing respectively a first ideal performance metric categorization and a second ideal performance metric categorization. First ideal performance metric categorization may have a first fuzzy set; Second ideal performance metric categorization may have a second fuzzy set; and performance metric may have an performance metric fuzzy set. computing device 104, for example, may compare an performance metric fuzzy set with each of ideal performance metric categorization fuzzy set and an ideal performance metric categorization fuzzy set, as described above, and classify a performance metric to either, both, or neither of ideal performance metric categorization nor an ideal performance metric categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, performance metric may be used indirectly to determine a fuzzy set, as performance metric fuzzy set may be derived from outputs of one or more machine-learning models that take the performance metric directly or indirectly as inputs.

Still referring to FIG. 5, a computing device may use a logic comparison program, such as, but not limited to, a fuzzy logic model to determine an ideal performance metric response. An ideal performance metric response may include, but is not limited to, inadequate, average, poor, superior, and the like; each such ideal performance metric response may be represented as a value for a linguistic variable representing ideal performance metric response or in other words a fuzzy set as described above that corresponds to a degree of underperformance as calculated using any statistical, machine-learning, or other method that may occur to a person skilled in the art upon reviewing the entirety of this disclosure. In other words, a given element of performance metric may have a first non-zero value for membership in a first linguistic variable value such as "poor" and a second non-zero value for membership in a second linguistic variable value such as "inadequate" In some embodiments, determining an ideal performance metric categorization may include using a linear regression model. A linear regression model may include a machine learning model. A linear regression model may be configured to map data of performance metric, such as degree of match to one or more ideal performance metric parameters. A linear regression model may be trained using a machine learning process. In some embodiments, determining an ideal performance metric of performance metric may include using an ideal performance metric classification model. An ideal performance metric classification model may be configured to input collected data and cluster data to a centroid based on, but not limited to, frequency of appearance, linguistic indicators of quality, and the like. Centroids may include scores assigned to them such that quality of performance of performance metric may each be assigned a score. In some embodiments ideal performance metric classification model may include a K-means clustering model. In some embodiments, ideal performance metric classification model may include a particle swarm optimization model. In some embodiments, determining the ideal performance metric of an performance metric may include using a fuzzy inference engine. A fuzzy inference engine may be configured to map one or more performance metric data elements using fuzzy logic. In some embodiments, performance metric may be arranged by a logic comparison program into ideal performance metric arrangement. An "ideal performance metric arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given underperformance level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to performance metric, such as a degree of underperformance of an element, while a second membership function may indicate a degree of math of a subject thereof, or another measurable value pertaining to performance metric. Continuing the example, an output linguistic variable may represent, without limitation, a score value. An inference engine may combine rules, such as: "if the employment satisfaction level is 'low and the employment retainment level is 'high', the performance score is 'average'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤ T(c, d) if a≤ c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤ c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 6:
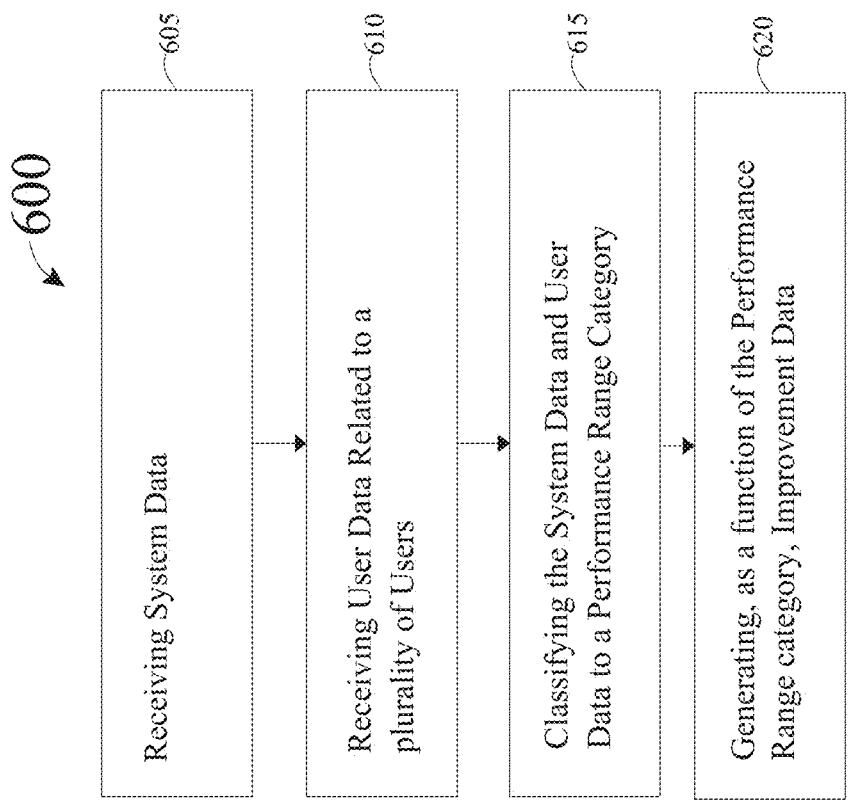
FIG. 6 is a flow diagram of an exemplary method for generating system improvement data.

Referring now to FIG. 6, is a flow diagram of an exemplary method 600 for generating system improvement data. At step 605, method 600 includes receiving, by at least a computing device, system data, wherein receiving the system data may include training and utilizing a web crawler configured to generate a web index of the system data. Receiving the system data may include identifying inconsistencies contained in the system data utilizing a language processing model. The computing device may be configured to correct the identified inconsistencies. Step 605 may be implemented as described in FIG. 1-5. At step 610, method 600 includes receiving, by the at least computing device, user data related to a plurality of users. Step 605 may be implemented as described in FIG. 1-5. At step 615, method 600 includes classifying, by the at least computing device, the system data and user data to a performance range category. Step 605 may be implemented as described in FIG. 1-5. Classifying the system data and user data may include receiving performance category training data correlating the system data and user data to a plurality of ideal performance metrics; training a performance classifier as a function of the performance category training data, and outputting the performance range category as a function of the performance classifier. Classifying the system data and user data may include generating a performance report comprising a plurality of inadequate performance metrics. Generating the performance report may include ranking the plurality of inadequate performance metrics based on a level of underperformance. Ranking the plurality of inadequate performance metrics may include utilizing a fuzzy set inference system. At step 620, method 600 includes generating, by the at least computing device, as a function of the performance range category, system improvement data. Step 605 may be implemented as described in FIG. 1-5. Generating the system improvement data may include incorporating a performance report. Generating the improvement data may include receiving improvement training data correlating a plurality of elements of a performance report to a plurality of improvement features, training an improvement classifier as a function of the improvement training data, and outputting the system improvement data as a function of the improvement classifier. Generating the improvement data may include transmitting the performance report to a user device, receiving user feedback comprising prioritization of improving an inadequate performance metric of the plurality of inadequate performance metrics, inputting the user feedback into the machine-learning model as an input, outputting the system improvement data incorporating the user feedback.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
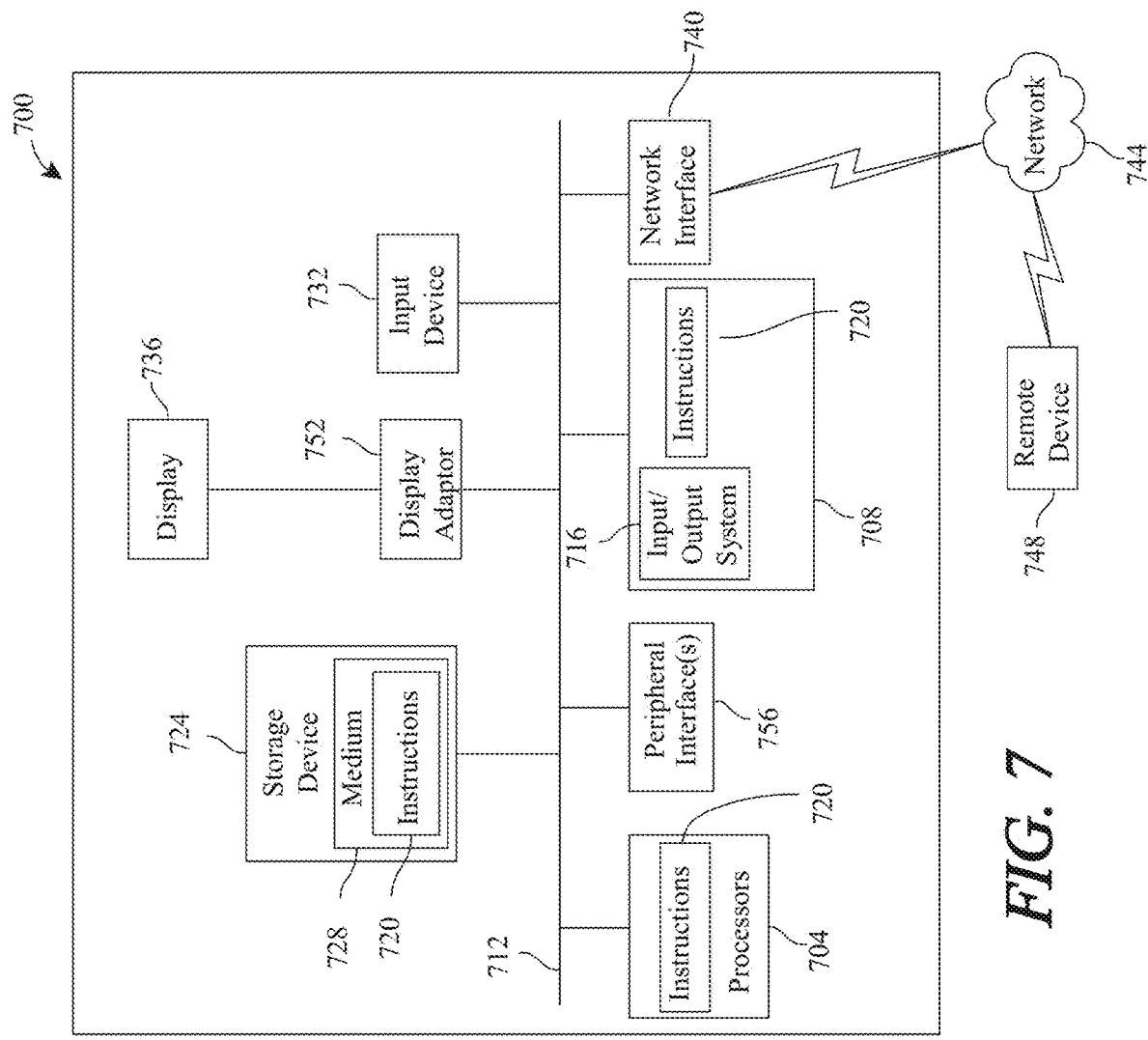
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating system improvement data, wherein the apparatus comprises:
   at least a processor;
   a memory communicatively connected to the at least a processor, wherein the memory containing instructions configuring the at least a processor to:
   receive system data relating to an organizational identifier, wherein receiving the system data comprises:
   training and utilizing a web crawler to generate a web index;
   generating a query as a function of the organizational identifier; and
   retrieving the system data as a function of the web index and the organizational identifier;
   receive user data related to a plurality of users, wherein user data comprises a plurality of feedback relating to a system;
   classify the system data and user data to a performance range category, wherein classifying the system data and user data comprises:
   receiving performance category training data, wherein the performance category training data comprises the system data and user data as inputs correlated to a plurality of performance range categories as outputs;
   training a performance classifier as a function of the performance category training data, wherein training the performance classifier comprises:
   iteratively updating the performance category training data as a function of input and output results of the performance classifier; and
   retraining the performance classifier with an updated performance category training data; and
   outputting the performance range category as a function of the performance classifier;
   generate a performance report comprising a plurality of inadequate performance metrics, wherein generating the performance report comprises ranking the plurality of inadequate performance metrics based on a comparison of levels of underperformance and ideal performance metrics; and
   generate, as a function of the performance range category, improvement data by:
   deriving a plurality of improvements features by:

retrieving and indexing a plurality of systems related to the system as a function of the system data; and identifying trends correlated to a high performance of the plurality of systems;

generating improvement training data correlating a plurality of elements of the performance report to a plurality of improvement features;

training an improvement classifier as a function of the improvement training data; and outputting the improvement data as a function of the improvement classifier, wherein the improvement data comprises an improvement plan that is configured to outline at least a step to improve adequacy and an improvement feature that is related to a practice of an organization related to the system.

2. The apparatus of claim 1, wherein receiving the system data further comprises identifying inconsistencies contained in the system data utilizing a language processing model.

3. The apparatus of claim 2, wherein the memory contains instructions further configuring the at least a processor to automatedly correct the identified inconsistencies.

4. The apparatus of claim 1, wherein ranking the plurality of inadequate performance metrics comprises utilizing a fuzzy set inference system.

5. The apparatus of claim 4, wherein the fuzzy set inference system comprises a fuzzy logic model, wherein the fuzzy logic model determines an ideal performance metric response as a function of a fuzzy set comparison technique.

6. The apparatus of claim 1, wherein generating the improvement data comprises incorporating the performance report.

7. The apparatus of claim 1, wherein generating the improvement data further comprises:

transmitting the performance report to a user device;

receiving user feedback comprising prioritization of improving an inadequate performance metric of the plurality of inadequate performance metrics;

inputting the user feedback into the improvement classifier as an input; and outputting the improvement data incorporating the user feedback.

8. A method for generating system improvement data, wherein the method comprises:

receiving, by at least a computing device, system data, wherein receiving the system data comprises training and utilizing a web crawler configured to generate a web index of the system data;

receiving, by the at least computing device, user data related to a plurality of users, wherein user data comprises a plurality of feedback relating to a system;

classifying, by the at least computing device, the system data and user data to a performance range category, wherein classifying the system data and user data comprises:

receiving performance category training data, wherein the performance category training data comprises the system data and user data as inputs correlated to a plurality of performance range categories as outputs;

training a performance classifier as a function of the performance category training data, wherein training the performance classifier comprises:

iteratively updating the performance category training data as a function of input and output results of the performance classifier; and retraining the performance classifier with an updated performance category training data; and outputting the performance range category as a function of the performance classifier;

generating, by the at least a computing device, a performance report comprising a plurality of inadequate performance metrics, wherein generating the performance report comprises ranking the plurality of inadequate performance metrics based on a comparison of levels of underperformance and ideal performance metrics; and generating, by the at least computing device, as a function of the performance range category, improvement data by:

deriving a plurality of improvements features by:

retrieving and indexing a plurality of systems related to the system as a function of the system data; and identifying trends correlated to a high performance of the plurality of systems;

generating improvement training data correlating a plurality of elements of the performance report to a plurality of improvement features;

training an improvement classifier as a function of the improvement training data; and outputting the improvement data as a function of the improvement classifier, wherein the improvement data comprises an improvement plan that is configured to outline at least a step to improve adequacy and an improvement feature that is related to a practice of an organization related to the system.

9. The method of claim 8, wherein receiving the system data further comprises identifying inconsistencies contained in the system data utilizing a language processing model.

10. The method of claim 9, wherein further comprising automatedly correcting the identified inconsistencies.

11. The method of claim 8, wherein ranking the plurality of inadequate performance metrics comprises utilizing a fuzzy set inference system.

12. The method of claim 11, wherein the fuzzy set inference system comprises a fuzzy logic model, wherein the fuzzy logic model determines an ideal performance metric response as a function of a fuzzy set comparison technique.

13. The method of claim 8, wherein generating the improvement data comprises incorporating the performance report.

14. The method of claim 8, wherein generating the improvement data further comprises:

transmitting the performance report to a user device;

receiving user feedback comprising prioritization of improving an inadequate performance metric of the plurality of inadequate performance metrics;

inputting the user feedback into the improvement classifier as an input; and outputting the improvement data incorporating the user feedback.

* * * * *